United States Patent [19]

Nakamura

[11] Patent Number: 5,257,763

[45] Date of Patent: Nov. 2, 1993

[54] CABLE HOLDER

[75] Inventor: Toshinobu Nakamura, Tokyo, Japan

[73] Assignee: Shinagawa Shoko Co., Ltd., Tokyo, Japan

[21] Appl. No.: 870,826

[22] Filed: Apr. 20, 1992

[51] Int. Cl.$^5$ ............................................. F16L 5/00
[52] U.S. Cl. ..................................... 248/56; 248/74.1
[58] Field of Search ...................... 248/56, 74.1, 74.2; 24/71 CT; 174/153 G

[56] References Cited

U.S. PATENT DOCUMENTS

| | | |
|---|---|---|
| 3,689,014 | 9/1972 | Fink . |
| 3,958,300 | 5/1976 | Tanaka . |
| 4,117,998 | 10/1978 | Notoya ................................. 248/56 |
| 4,125,238 | 11/1978 | Tanaka ................................. 248/56 |
| 4,216,930 | 8/1980 | Rossler, Jr. et al. ................. 248/56 |
| 4,291,855 | 9/1981 | Schenkel et al. ................. 248/74.1 |

FOREIGN PATENT DOCUMENTS

| | | |
|---|---|---|
| 0273786 | 7/1988 | European Pat. Off. . |
| 0348226 | 12/1989 | European Pat. Off. . |
| 1531115 | 11/1978 | United Kingdom . |
| 1596751 | 8/1981 | United Kingdom . |

Primary Examiner—Ramon O. Ramirez
Assistant Examiner—Sarah A. Lechok
Attorney, Agent, or Firm—Wegner, Cantor, Mueller & Player

[57] ABSTRACT

A self-coupling type cable holder composed of two holder halves molded integral with each other via two hinges at the opposite ends using a thermoplastic resin is disclosed. When a cable is immovably held in the cable holder, the both holder halves are assembled together to build a single cable holder in the closed state. The one holder half includes a coupling hook and the other holder half includes a receiving portion. The coupling hook is brought in engagement with the receiving portion when the both holder halves are assembled together in the closed state. A groove is formed in the other holder half to guide movement of the coupling hook in the inward direction when the both holder halves are assembled together. In addition, the one holder half includes projections on a flange portion on the larger diameter side and the other holder half includes recesses on a flange portion on the larger diameter side so that the projections are fitted into the recesses when the both holder halves are assembled together while establishing a correct positional relationship relative to each other. It is desirable that a cable is immovably held in the cable holder in the bent state. To this end, a projection is formed on the one holder half and a spring portion is molded integral with the other holder half.

4 Claims, 3 Drawing Sheets

CABLE HOLDER

FIELD OF THE INVENTION

The present invention relates generally to a cable holder. More particularly, the present invention relates to a self-coupling type cable holder for immovably holding a cable such as a cord or the like in the electrically insulated state so as to allow the cable holder to be firmly fitted into a fitting hole on a panel for an electric/electronic apparatus or the like.

PRIOR ART

As is well known, a cable such as a supply source cord or the like is usually drawn out from the interior of an electric/electronic apparatus such as an audio/video apparatus, an office automation apparatus or the like through a fitting hole on a panel for a housing of the apparatus. At this time, it is necessary that the cable is immovably held at the fitting hole in the electrically insulated state. In addition, to prevent an occurrence of wire disconnection due to unnecessary movement of the cable, it is required that the cable is immovably held at the panel with a predetermined magnitude of holding force enough to stand against a certain pulling force. To meet the foregoing requirement, it has been that a cable holder a molded of a thermoplastic resin such as a nylon or the like is used so as to immovably hold the cable in the cable holder after the cable is drawn out by a certain length through the fitting hole on the panel of the apparatus.

To facilitate understanding of the present invention, a typical conventional cable holder will briefly be described below with reference to FIG. 5 to FIG. 7.

The cable holder includes a female member 101 having an U-shaped sectional shape so as to allow a cord to be inserted therethrough and a male member 103 adapted to be fitted into a groove 102 of the female member 101. The female member 101 is formed with a cutout 123 on one side wall thereof. The cutout 123 downwardly extends to the bottom of the groove 102. In addition, a thread-shaped connecting piece 122 is molded integral with the female member 101 and the male member 103 while extending from the bottom of the cutout 123 to the male member 103. When a cord 104 is immovably held in the cable holder, the cord 104 is first placed on the groove 102 of the female member 101 and the male member 103 is then fitted into the groove 102 of the female member 101 to build a single cable holder in the closed state while the cord 104 is immovably held between the female member 101 and the male member 103 with the aid of a plier or the like tool, as shown in FIG. 6. Thereafter, the cable holder is firmly fitted into a fitting hole 117 on a panel 116 for an electric/electronic apparatus or the like. Since the both members 101 and 103 are assembled together with the connection piece 122 without projection of any hinge outside of the cable holder in the above-described manner, the cable holder has an advantage that the cord 104 is fixedly held between the both members 101 and 103 with a large magnitude of clamping force derived from the connection piece 122 located therebetween.

However, it has been found that the conventional cable holder constructed in the above-described manner has drawbacks that production of the cable holder is very complicated due to the presence of the thread-shaped connection piece 122 and moreover when the connection piece 122 is broken or torn off from the male member 103, the cable holder fails to exhibit its own operational function. Consequently, the cable holder is produced at an expensive cost.

In addition, since the female member 101 and the male member 103 do not have any fixing means and thereby the both members 101 and 103 are assembled together only when the cable holder is fitted into the fitting hole 117, the cord 104 can not previously be fixed at a predetermined position. This leads to the result that the cable holder is produced at a low operational efficiency on a production line and the position where the cord 104 is immovably held between the both members 101 and 103 differs from operator to operator.

Other drawback is that the cable holder has low reliability because the cord 104 is undersirably loosened when an excessive tensile force is imparted to the cord 104. Additionally, another drawback is that a fitting operation is performed at a low operational efficiency with much difficulties because of a necessity for fitting the cable holder into the fitting hole 117 while the both members 101 and 103 are assembled together with the aid of a plier or the like tool.

The present invention has been made with the foregoing background in mind.

SUMMARY OF THE INVENTION

An object of the present invention is to provide a cable holder of the type composed of two holder halves wherein the holder halves are constructed in a self-coupling type so as to improve an operational efficiency and reliability.

Other object of the present invention is to provide a cable holder of the type composed of two holder halves wherein self-coupling is accomplished easily and reliably.

Another object of the present invention is to provide a cable holder of the type composed of two holder halves wherein the cable holder can reliably be fitted into a fitting hole on a panel for an electric/electronic apparatus or the like.

BRIEF DESCRIPTION OF THE DRAWINGS

FIG. 7 is a perspective view of the conventional cable holder, particularly illustrating that it is fitted into a fitting hole on a panel for an electric/electronic apparatus or the like.

DETAILED DESCRIPTION AND THE PREFERRED EMBODIMENTS

Figure 1:
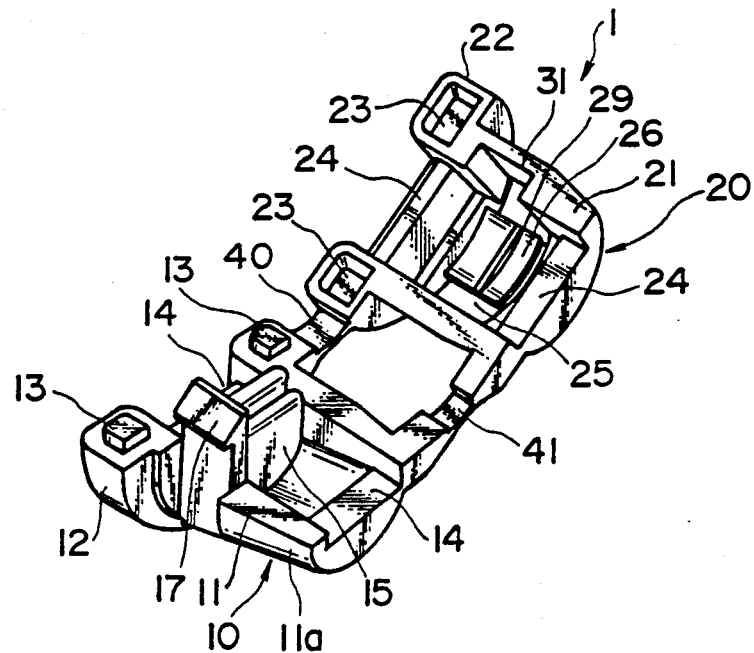
FIG. 1 is a perspective view of a cable holder in accordance with an embodiment of the present invention, particularly illustrating an opened inoperative state of the cable holder.

To accomplish the above objects, the present invention provides a cable holder comprising two holder halves molded of a thermoplastic resin in an integral structure wherein the two holder halves extend in the substantially horizontal direction in the opened state when they are held in the inoperative state, and they are assembled together to build a single cable holder in the closed state when a cable is immovably held in the cable holder in the bent state, wherein one of the holder halves is jointed to the other half via at least a hinge on a flange portion at one end of the cable holder and wherein the one holder half includes a coupling hook and the other holder half includes a holding portion with which the coupling hook is brought in engagement when the both holder halves are assembled together to build a single cable holder in the closed state.

The coupling hook is formed at the middle part of the one holder half as seen in the axial direction while extending in the inward direction, and the holding portion is formed at the middle part of the other holder half as seen in the axial direction.

In addition, a groove is formed in the other holder half to guide movement of the coupling hook in the inward direction when the both holder halves are assembled together to build a single cable holder in the closed state.

To establish a correct positional relationship between the two holder halves, the one holder half includes projections on a flange portion on the larger diameter side thereof and the other holder half includes recesses on a flange portion on the larger diameter side thereof so that the projections are fitted into the recesses when the both holder halves are assembled together to build a single cable holder in the closed state.

In addition, to assure that a cable is immovably held in the cable holder in the bent state, the one holder half includes clamp portions at the opposite ends and a projection at the middle part thereof as seen in the axial direction, and the other holder half includes clamp portions at the opposite ends thereof and a spring portion molded integral therewith at the opposite position to the projection on the one holder half.

With such construction of the cable holder, when the both holder halves are assembled together such that a cable is immovably held in the cable holder at a predetermined position along the length of the cable, the coupling hook is brought in engagement with the holding portion, whereby the both holder halves can be assembled together by an operator's one-touch operation. Therefore, the both cable holders can previously be fixed on the cable before the cable holder is fitted into a fitting hole on a panel for an electric/electronic apparatus. Thereafter, the cable holder can firmly be fitted into the fitting hole on the panel merely by forcibly squeezing the cable holder into the fitting hole.

Other objects, features and advantages of the present invention will become apparent from reading of the following description which has been made in conjunction with the accompanying drawings.

Now, the present invention will be described in detail hereinafter with reference to the accompanying drawings which illustrate preferred embodiments of the present invention.

Figure 2:
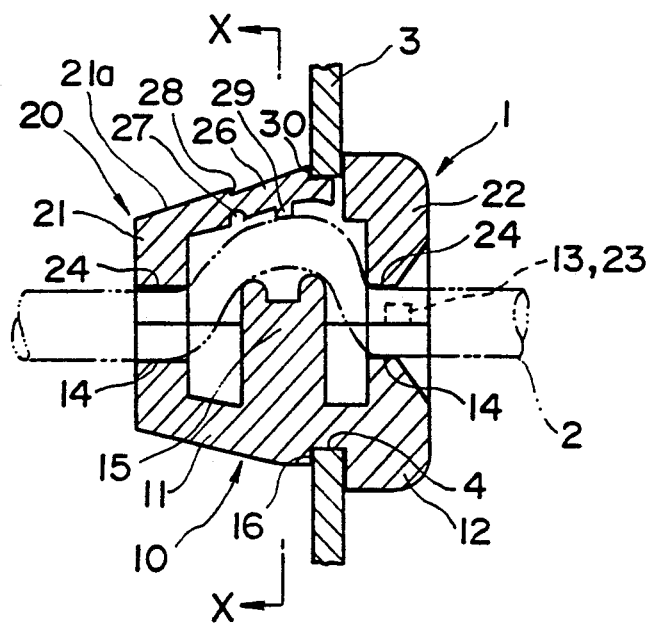
FIG. 2 is a sectional view of the cable holder in FIG. 1, particularly illustrating that it is fitted into a fitting hole on a panel for an electric/electronic apparatus or the like after it is immovably mounted on a cable.
Figure 3:
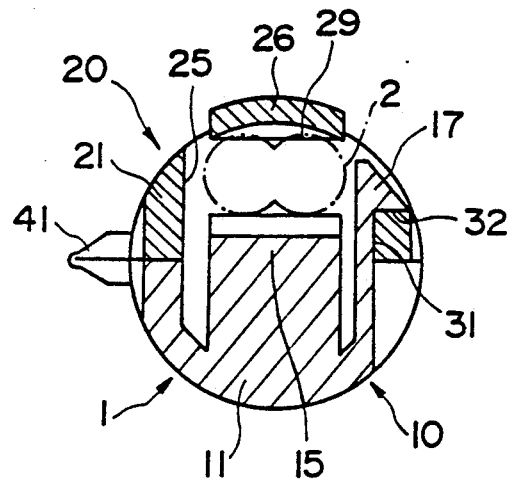
FIG. 3 is a sectional view of the cable holder taken in line X—X in FIG. 2.

In FIG. 1 to FIG. 3, reference numeral 1 generally designates a cable holder in accordance with an embodiment of the present invention. The cable holder 1 is molded of a theremoplastic resin having an electrical insulating property such as a nylon or the like. As is best seen in FIG. 1, the cable holder 1 is composed of two semicylindrical holder halves 10 and 20 both of which are cut along a radially extending plane. One holder half 10 includes a semicylindrical sleeve portion 11 of which outer surface 11a is designed in the semiconical configuration. In addition, the sleeve portion 11 includes a flange portion 12 having a larger diameter at the right-hand end thereof as seen in FIG. 1. Similarly, other holder half 20 includes a sleeve portion 21 and a flange portion 22 each of which configuration coincides with that of the sleeve portion 11 and the flange portion 12. For this reason, when the two holder halves 10 and 20 are assembled together, a single cable holder 1 having an integral structure is obtained in the closed state.

The two holder halves 10 and 20 are integrally jointed to each other via hinge portions 40 and 41. With this arrangement of the hinge portions 40 and 41, the cable holder 1 can integrally be molded such that the two holder halves 10 and 20 extend in the substantially horizontal direction, as shown in FIG. 1. When the cable holder 1 is put in practical use, the two holder halves 10 and 20 are assembled together in the closed state while exhibiting a cylindrical configuration. To assure that the two holder halves 10 and 20 are correctly located relative to each other in the closed state, the flange portion 12 is formed with projections 13 on the joint surface and the flange portion 22 is formed with recesses 23 on the joint surface so that the projections 12 are fitted into the corresponding recesses 23 when the two holder halves 10 and 20 are assembled together.

In addition, to assure that a cable 2 is immovably held between the two holder halves 10 and 20 while extending through the cable holder 1 in the bent state as shown in FIG. 2, the one holder half 10 includes clamp portions 14 at opposite ends thereof corresponding to a size of the cable 2, and a projection 15 is formed at the middle part of the one holder half 10. Similarly, the other holder half 20 includes clamp portions 24, and a window hole 25 is formed at the middle part of the other holder half 20. An arc-shaped leaf spring 26 is molded integral with the sleeve portion 21 while covering a part of the window hole 25 therewith. As shown in FIG. 2, the leaf spring 26 is formed with cutouts 27 and 28 on the inside and outside of the joint region where the leaf spring 26 is integrated with the sleeve portion 21, so as to generate a predetermined intensity of resilient force with the leaf spring 26. While the leaf spring 26 is held in the free state, the right-hand end of the leaf spring 26 is projected outside of the outer peripheral surface 21a of the sleeve portion 21. The leaf spring 26 is formed with a projection 29 on the inside thereof so as to prevent the cable 2 from being released from the immovably held state. Additionally, the leaf spring 26 is formed with a stepped part 30 on the outside thereof for the purpose of preventing the cable holder 1 from being disconnected from a panel 3 after it is fitted into a fitting hole 14.

The holder half 10 is formed with a groove 16 on the larger diameter side of the sleeve portion 11 corresponding to the stepped part 30 of the leaf spring 26 on the holder half 20 so that the panel 3 is firmly fitted into the groove 16 when the cable holder 1 is fitted into the fitting hole 4.

As shown in FIG. 3, to establish a self-coupling system with the two holder halves 10 and 20, the one holder half 10 includes an inwardly extending coupling hook 17 at the middle part on the opposite side to the hinge pieces 40 and 41 in the region where no interference takes place with the leaf spring 26 on the other holder half 20. In addition, the other holder half 20 includes a holding portion 32 and a groove 31 for receiving the coupling hook 31 at the position sideward of the window hole 25 so that the coupling hook 17 on the one holder half 10 is brought in engagement with the receiving portion 32 on the other holder half 20 by an operator's one-touch operation when the both holder halves 10 and 20 are assembled together to build a single cable holder 1 in the closed state.

Next, an operation for firmly holding the cable 2 on the panel 3 for an electric/electronic apparatus or the like (not shown) using the cable holder 1 of the present invention will be described below.

Since the cable holder 1 is constructed in the self-coupling type in the above-described manner, it can previously be fixed on the cable 2 for an electric/electronic apparatus. First, an optimum fixing position of the cable holder 1 on the cable 2 is determined in consideration of the present wiring state of the cable 2, and a mark A is then put on the cable 2 at the position corresponding to the foregoing optimum position of the cable holder 1. While the both holder halves 10 and 20 are held in the opened inoperative state as shown in FIG. 1, the cable 2 is placed on the clamping pieces 14 and the projection 15 on the one holder half 10 with the mark A located in alignment with, e.g., the projection 15. Thereafter, the other holder half 20 is superposed on the one holder half 10 so that the both holder halves 10 and 20 are forcibly assembled together in the closed state with operator's hands.

With this assembling operation of the both holder halves 10 and 20, the cable 2 is bent in the inverted V-shaped configuration. At this time, when the cable 2 is not correctly aligned with the axes of the both holder halves 10 and 20 or the one holder half 10 fails to match with the other holder half 20 due to the resistive force derived from the forcible bending of the cable 2, the coupling hook 17 is offset from the groove 31 and collides against the sleeve portion 21. Thus, the one holder half 10 can not be closed any more. On the contrary, when the coupling hook 17 is aligned with the groove 31 and thereby the both holder halves 10 and 20 are ready to be assembled together, the coupling hook 17 slidably moves along the groove 31 until the both holder halves 10 and 20 are assembled together in the closed state. When the both holder halves 10 and 20 are assembled together in the above-described manner to build an integral cable holder 1 in the closed state, the projections 13 on the flange portion 12 are fitted into the recesses 23 on the flange portion 22 to settle the correct positional relationship. Additionally, the coupling hook 17 is brought in engagement with the holding portion 32 from the inside of the holder half 20. Consequently, assembling of the both holder halves 10 and 20 is achieved by an operator's one-touch operation. It should be noted that the cable 2 in the both holder halves 10 and 20 is bent in the immovably clamped state in cooperation of the holding portions 14 and 24 at the opposite end parts of the both holder halves 10 and 20 with the projection 15, the leaf spring 26 and the projection 29 at the middle part of the same, as shown in FIG. 2.

After the cable holder 1 is fixedly mounted on the cable 2 in the above-described manner, a wiring operation is performed for the electric/electronic apparatus. A step of firmly fitting the cable holder 1 to the apparatus is accomplished such that the smaller diameter sleeve side of the cable holder 1 is first inserted through the fitting hole 4 on the panel 3 and the cable holder 1 is then forcibly squeezed into the fitting hole 4. Subsequently, while the leaf spring 26 is flexed, the cable holder 1 is displaced until the stepped part 30 on the leaf spring 26 collides against the panel 3. Since the cable holder 1 is firmly fitted into the fitting hole 4 by the resilient force of the leaf spring 26 in cooperation with the flange portions 12 and 22 and the stepped part 30, there is no possibility that the cable holder 1 is undesirably disconnected from the panel 3. Thus, while the cable holder 1 is firmly fitted to the panel 3, the cable 2 is immovably held in the cable holder 1 with a predetermined magnitude of holding force in the electrically insulated state.

Figure 4:
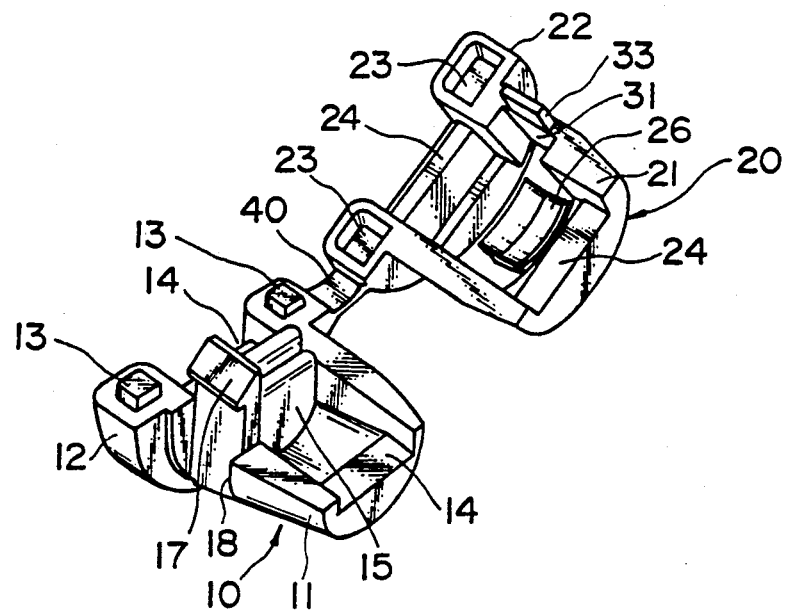
FIG. 4 is a perspective view of a cable holder in accordance with another embodiment of the present invention, particularly illustrating an opened inoperative state of the cable holer.
Figure 5:
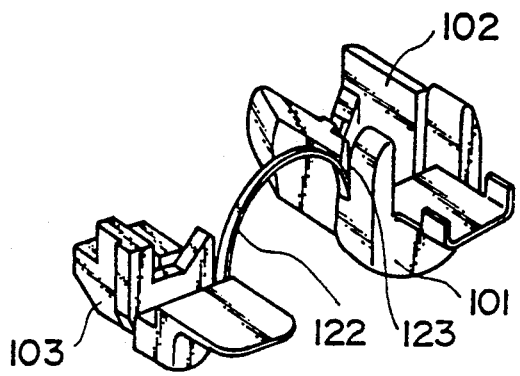
FIG. 5 is a perspective view of a conventional cable holder, particularly illustrating an opened inoperative state of the cable holder.
Figure 6:
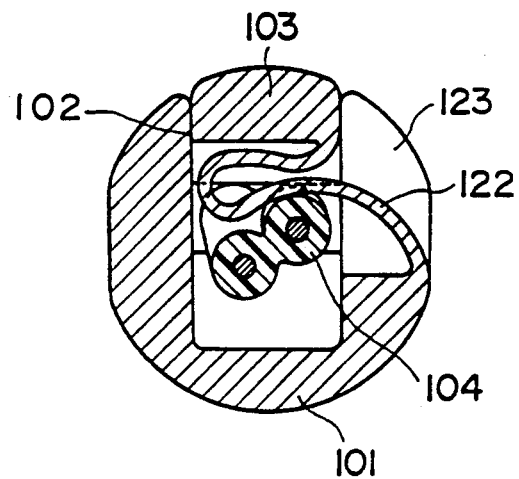
FIG. 6 is a sectional view of the conventional cable holder in FIG. 5.
Figure 7:
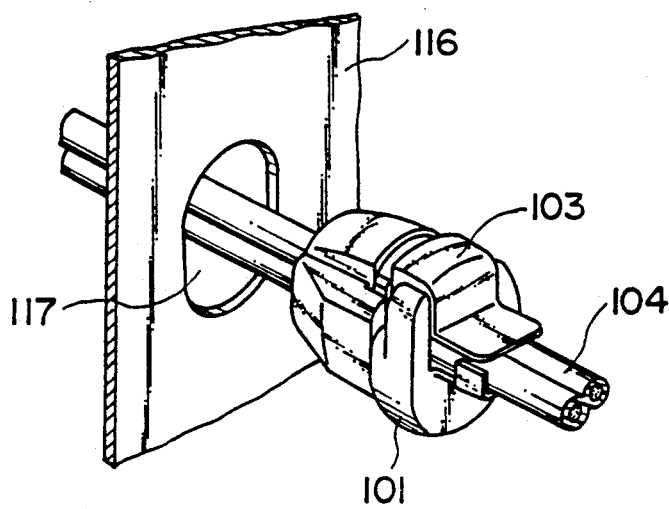

Next, another embodiment of the present invention will be described below with reference to FIG. 4.

According to this embodiment, a cable holder 1 is likewise composed of two cable halves 10 and 20 but includes a single hinge portion 40 on the flange portion side designates by reference numerals 12 and 22. In addition, a projection 33 projecting adjacent to a groove 31 on the other holder half 20 is brought in engagement with a groove 18 which is formed when a coupling hook 17 is molded on the one holder half 10. The cable holder in accordance with this embodiment of the present invention is same in structure to the cable holder in accordance with the preceding embodiment of the present invention with the except of the above-described construction, and same or similar parts or components to those in the preceding embodiment of the present invention are represented by same reference numerals. Thus, repeated description will not be required. In this embodiment, since the cable holder 1 includes no hinge piece on the smaller diameter side of the sleeve portions 11 and 21, insertion of the cable holder 1 into the fitting hole 1 can be accomplished easily. In practice, however, there is a possibility that the one holder half 10 fails to be aligned with the other holder half 20 when the both holder halves 10 and 20 are assembled together. However, since a correct positional relationship is established by double fittings wherein one of them is fitting of the coupling hook 17 into the groove 31 and the other one is a fitting of the projection 33 into the groove 18, the both holder halves 10 and 20 can firmly and exactly be assembled together with a sufficiently high intensity of coupling strength.

As described above, according to the present invention, since a cable holder is composed of two holder halves each of which is constructed in a self-coupling type, the cable holder can previously be fixed on a cable. This makes it possible to divisionally perform an assembling operation on a production line. Since the both holder halves can always fixedly be assembled together at an optimum position on the cable depending on the present wiring state of the cable, the position where the cable holder is fixedly mounted on the cable can be stabilized while preventing an occurrence of various malfunction. In addition, reliability of the cable holder can be improved substantially.

Since fitting of the cable holder to a panel for an electric/electronic apparatus is accomplished merely by forcibly squeezing the cable holder into a fitting hole on the panel, a fitting operation can easily be performed in a simplified manner with high accuracy.

Further, since the two holder halves are assembled together in the closed state by fitting a coupling hook into a groove and bringing the coupling hook in engagement with a holding portion by an operator's one-touch actuation, a jointing operation can easily and reliably be performed at an improved operational efficiency.

Additionally, since the cable holder has a position aligning function with the aid of a combination of projections with recesses, a high intensity of coupling intensity is assured.

While the present invention has been described above with respect to two preferred embodiments thereof, it should of course be understood that the present invention should not be limited only to these embodiments but various changes or modifications may be made without departure from the scope of the invention as defined by the appended claims.

What is claimed is:

1. A cable holder comprising two holder halves molded of a thermoplastic resin in an integral structure wherein said to holder halves extend in the substantially horizontal direction in the opened state when they are held in the inoperative state, and they are assembled together to build a single cable holder in the closed state when a cable is immovably held in said cable holder in the bent state, wherein one of the holder halves is jointed to the other holder half via at least a hinge on a flange portion at one end of the cable holder and that the one holder half includes a coupling hook and the other holder half includes a holding portion with which said coupling hook is brought in engagement when the both holder halves are assembled together and wherein the one holder half includes clamp portions at the opposite ends and a projection at the middle part thereof as seen in the axial direction and the other holder half includes clamp portions at the opposite ends thereof and a spring portion molded integral therewith at the opposite position to said projection on the one holder half so as to allow said cable to be immovably held in the cable holder in the bent state in cooperation of said flange portions and said spring portion on the other holder half when the both holder halves are assembled together to build a single cable holder in the closed state.

2. The cable holder as claimed in claim 1, wherein said coupling hook is formed at the middle part of the one holder half as seen in the axial direction while extending in the inward direction and said holding portion is formed at the middle part of the other holder half as seen in the axial direction and that a groove is formed in the other holder half to guide movement of the coupling hook in the inward direction when the both holder halves are assembled together to build a single cable holder in the closed state.

3. The cable holder as claimed in claim 1, wherein the one holder half includes projections on a flange portion on the larger diameter side thereof and the other holder half includes recesses on a flange portion on the larger diameter side thereof so that said projections are fitted into said recesses when the both holder halves are assembled together to build a single cable holder in the closed state while establishing a correct positional relationship relative to each other.

4. The cable holder as claimed in claim 1, wherein the other holder half is formed with a projection adjacent to the holding portion, said projection being fitted into a groove formed adjacent to the coupling hook on the one holder half when the both holder halves are assembled together to build a single cable holder in the closed state.

* * * * *